(12) United States Patent
Tsuru

(10) Patent No.: US 11,878,697 B2
(45) Date of Patent: Jan. 23, 2024

(54) VEHICLE CONTROL DEVICE

(71) Applicant: DENSO CORPORATION, Kariya (JP)

(72) Inventor: Naohiko Tsuru, Kariya (JP)

(73) Assignee: DENSO CORPORATION, Kariya (JP)

( * ) Notice: Subject to any disclaimer, the term of this patent is extended or adjusted under 35 U.S.C. 154(b) by 331 days.

(21) Appl. No.: 17/242,613

(22) Filed: Apr. 28, 2021

(65) Prior Publication Data

US 2021/0245762 A1 Aug. 12, 2021

Related U.S. Application Data

(63) Continuation of application No. PCT/JP2019/041936, filed on Oct. 25, 2019.

(30) Foreign Application Priority Data

Oct. 31, 2018 (JP) ................................. 2018-206060

(51) Int. Cl.
*B60W 40/072* (2012.01)
*B60W 30/045* (2012.01)
*B60W 30/09* (2012.01)

(52) U.S. Cl.
CPC ........ *B60W 40/072* (2013.01); *B60W 30/045* (2013.01); *B60W 30/09* (2013.01);
(Continued)

(58) Field of Classification Search
CPC .. B60W 40/072; B60W 30/045; B60W 30/09; B60W 2520/10; B60W 2520/105;
(Continued)

(56) References Cited

U.S. PATENT DOCUMENTS

2004/0111209 A1* 6/2004 Kagawa ............. B60K 31/0058
701/93
2005/0240334 A1* 10/2005 Matsumoto ........ B60K 31/0083
701/96

(Continued)

FOREIGN PATENT DOCUMENTS

JP H07-125565 A 5/1995
JP 4232806 A 3/2009
JP 2014-58211 A 4/2014

*Primary Examiner* — Jason Holloway
(74) *Attorney, Agent, or Firm* — MASCHOFF BRENNAN

(57) ABSTRACT

A vehicle control device includes: a distance-acquisition section acquiring a path end distance between a vehicle and an end of a turn-travel path, on which the vehicle travels with turning; a path-width-acquisition section acquiring a path width of the turn-travel path; a velocity-acquisition section acquiring a velocity of the vehicle; an anticipated-curvature-radius-acquisition section acquiring a curvature radius of an anticipated turn-travel path obtained by assuming that the turn-travel path starts from a pre-turn position, based on the path width and the path end distance obtained at the pre-turn position; a target-velocity-setting section setting a target velocity at which the vehicle should travel on the turn-travel path, based on the anticipated curvature radius; a target-acceleration/deceleration-calculation section calculating a target acceleration/deceleration for accelerating/decelerating the vehicle to the target velocity, based on the velocity of the vehicle and the target velocity, and a vehicle-control section performing acceleration/deceleration control based on the target acceleration/deceleration.

7 Claims, 5 Drawing Sheets

(52) U.S. Cl.
CPC ... *B60W 2520/10* (2013.01); *B60W 2520/105* (2013.01); *B60W 2520/12* (2013.01); *B60W 2520/125* (2013.01); *B60W 2552/30* (2020.02); *B60W 2720/106* (2013.01); *B60W 2720/125* (2013.01)

(58) Field of Classification Search
CPC ....... B60W 2520/12; B60W 2520/125; B60W 2552/30; B60W 2720/106; B60W 2720/125; B60W 30/0956; B60W 30/18145; B60W 2720/10; G08G 1/16
See application file for complete search history.

(56) References Cited

U.S. PATENT DOCUMENTS

| | | |
|---|---|---|
| 2007/0191997 A1 | 8/2007 | Isaji et al. |
| 2008/0059307 A1 | 3/2008 | Isaji et al. |
| 2012/0197496 A1 | 8/2012 | Limpibunterng et al. |
| 2016/0229399 A1* | 8/2016 | Wada ................ B60W 50/0097 |

* cited by examiner

VEHICLE CONTROL DEVICE

CROSS-REFERENCE TO RELATED APPLICATION

The present application is based on and claims the benefit of priority from earlier Japanese Patent Application No. 2018-206060 filed on Oct. 31, 2018, the description of which is incorporated herein by reference.

BACKGROUND

Technical Field

The present disclosure relates to a vehicle control device.

Related Art

When an own vehicle turns along a curved road or turns to avoid a preceding vehicle or the like, it is preferable that the velocity of the own vehicle is suitable for turning.

SUMMARY

As an aspect of the present disclosure, a vehicle control device is provided which includes: a distance acquisition section that acquires a path end distance, which is a distance between an own vehicle and an end of a turn travel path, which is located in a traveling direction of the own vehicle and on which the own vehicle travels with turning; a path width acquisition section that acquires a path width of the turn travel path; a velocity acquisition section that acquires a velocity of the own vehicle; an anticipated curvature radius acquisition section that acquires a curvature radius of an anticipated turn travel path obtained by assuming that the turn travel path starts from a pre-turn position before a position at which the own vehicle starts turning, based on the path width and the path end distance obtained at the pre-turn position; a target velocity setting section that sets a target velocity at which the own vehicle should travel on the turn travel path, based on the anticipated curvature radius; a target acceleration/deceleration calculation section that calculates a target acceleration/deceleration for accelerating or decelerating the own vehicle to the target velocity, based on the velocity of the own vehicle and the target velocity; and a vehicle control section that performs acceleration/deceleration control of the own vehicle based on the target acceleration/deceleration.

DETAILED DESCRIPTION OF THE PREFERRED EMBODIMENTS

When an own vehicle turns along a curved road or turns to avoid a preceding vehicle or the like, it is preferable that the velocity of the own vehicle is suitable for turning. Japanese patent No. 4232806 discloses a vehicle control device that acquires a radius of curvature of a curved road on which the own vehicle plans to travel to calculate a target velocity at which the own vehicle should travel on the curved road based on the radius of curvature, and that accelerates or decelerates the own vehicle so as to be at the target velocity.

In Japanese patent No. 4232806, the radius of curvature of the curved road on which the own vehicle plans to travel is acquired based on detections values from a laser or a camera sensor. Hence, since a time period from the acquisition of the radius of curvature to the start of actual travel of the own vehicle on the curved road is short, it may be difficult to accelerate or decelerate the own vehicle so as to be at the target velocity.

The present disclosure provides a vehicle control device that allows an own vehicle to accelerate or decelerate more appropriately before the own vehicle travels on a turn travel path such as a curved road.

First Embodiment

Figure 1:
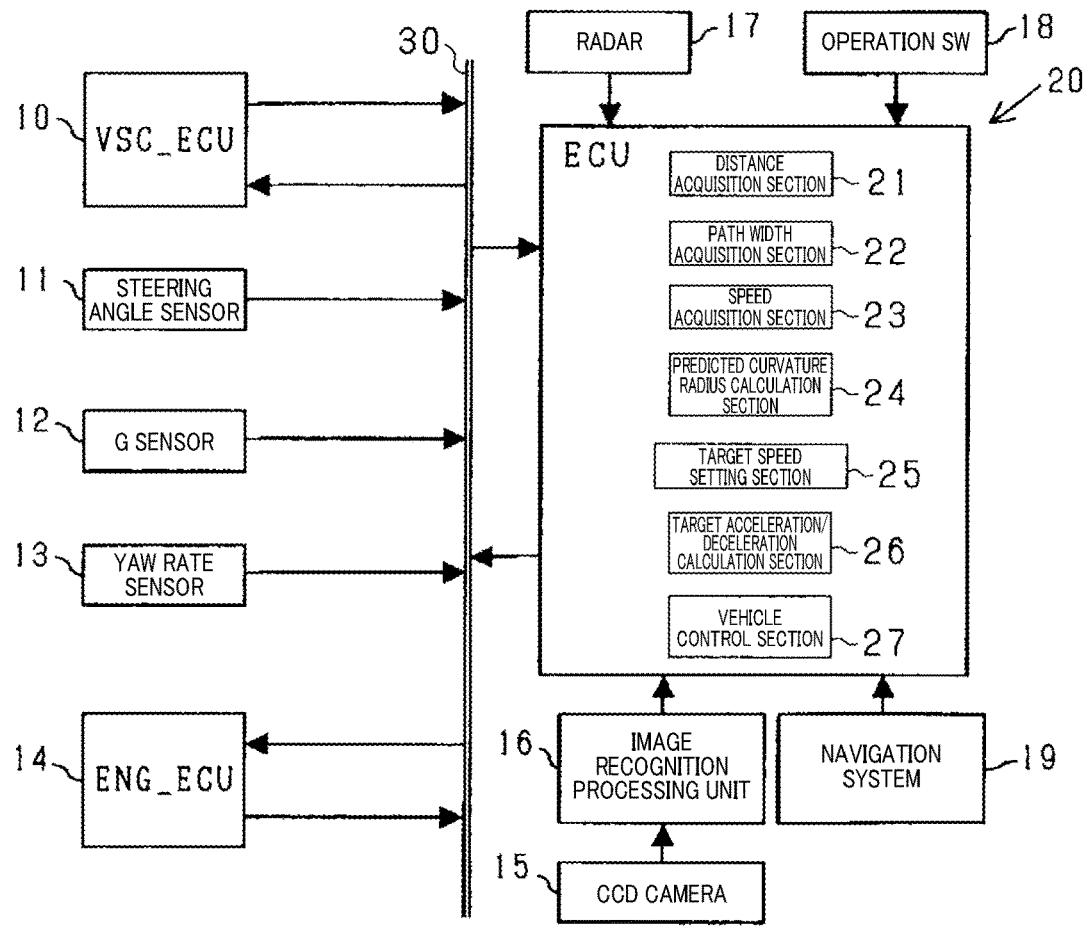
FIG. 1 is a system block diagram of a driving assistance system according to an embodiment.

FIG. 1 illustrates an overall configuration of a driving assistance system according to the present embodiment. As shown in FIG. 1, the driving assistance system includes a VSC_ECU 10, a steering angle sensor 11, a G sensor 12, a yaw rate sensor 13, an ENG_ECU 14, a CCD camera 15, an image recognition processing unit 16, a radar 17, an operation SW 18, a navigation system 19, and a vehicle control ECU 20.

The VSC_ECU 10 shown in FIG. 1 controls a break actuator (not shown) applying braking force to an own vehicle and includes a control function of VSC (Vehicle Stability Control, registered trademark) that suppresses a side skid of the own vehicle. The VSC_ECU 10 receives information on a target acceleration/deceleration from an in-vehicle LAN 30 and controls the break actuator so that the own vehicle reaches the target acceleration/deceleration. The VSC_ECU 10 transmits information on a velocity (speed) V of the own vehicle (vehicle velocity) and information on brake pressure to the in-vehicle LAN 30. The steering angle sensor 11 detects information on a steering angle of a steering wheel of the own vehicle and transmits the detected information on a steering angle to the in-vehicle LAN 30.

The G sensor 12 is an acceleration sensor that detects an acceleration or deceleration generated in the longitudinal direction of the own vehicle (forward/backward G) and an acceleration or deceleration generated in the lateral (right and left) direction of the own vehicle (lateral G) and transmits information on the detected forward/backward G and lateral G to the in-vehicle LAN 30. The yaw rate sensor 13 detects an angular velocity (yaw rate) around a vertical axis of the own vehicle and transmits information on the detected yaw rate to the in-vehicle LAN 30.

The ENG_ECU 14 receives information on the target acceleration/deceleration from the in-vehicle LAN 30 and controls a throttle actuator, not shown, so that the own vehicle reaches the target acceleration/deceleration. The CCD camera 15 is an imaging means that captures an image of a predetermined area in front of the own vehicle and outputs the captured image to the image recognition processing unit 16.

The image recognition processing unit 16 provides predetermined image recognition processing to the captured image output from the CCD camera 15 to recognize, for example, a structure accompanying the road such as a lane marking, a pole, a guardrail, and a curb provided on a road boundary of a curved road in front of the own vehicle or in the vicinity of the road boundary and obtain a relative position between the structure accompanying the road and the own vehicle. Then, the image recognition processing unit 16 outputs information on the type of the structure accompanying the road and the relative position to the vehicle control ECU 20.

The radar 17 radiates a laser beam to the predetermined area in front of the own vehicle and receives the reflected light to detect a distance to a structure accompanying the road, such as a reflective board, which is disposed on a road boundary of a curved road or in the vicinity of the road boundary and produces reflected light having predetermined intensity or more, or a delineator, a displacement (lateral displacement) between a central axis of the width of the own vehicle and a central axis of structure accompanying the road, and the like, and outputs the distance, the displacement, and the like to the vehicle control ECU 20.

The operation SW 18 is a group of switches operated by a driver. Operation information on the group of switches is output to the vehicle control ECU 20. The navigation system 19 includes a geomagnetic sensor, a gyroscope, and a distance sensor, which are well-known, a position detection section, road map data storage section, a color display, and a control circuit, none of which are shown. The position detection section includes a GPS receiver for a GPS (Global Positioning System) that detects a position of the own vehicle based on radio waves from satellites. The road map data storage section stores road map data. The color display uses a liquid crystal display, a CRT, or the like.

The road map data includes link data and node data for expressing roads on the map by links and nodes. The link data and node data includes information on coordinates of starting points and ending points of the links, lengths of the links, widths of lane markings, and radii of curvature of roads. The navigation system 19 receives a command from the vehicle control ECU 20 to obtain a current location of the own vehicle and outputs the link data and the node data of a curved road present in front of the own vehicle and within a predetermined distance.

The vehicle control ECU 20 is mainly configured by a microcomputer and includes a CPU, a ROM, a RAM, and an I/O, which are well known, and a bus connecting them. When a curved road is present in front of the own vehicle in the traveling direction, the vehicle control ECU 20 sets a target velocity at which the own vehicle should travel on the curved road and calculates a target acceleration/deceleration for accelerating or decelerating the own vehicle to the set target velocity. Then, the vehicle control ECU 20 performs acceleration/deceleration control so that an acceleration or a deceleration reaches the target acceleration/deceleration, based on the result of a comparison between the velocity of the own vehicle and the target velocity.

Figure 2:
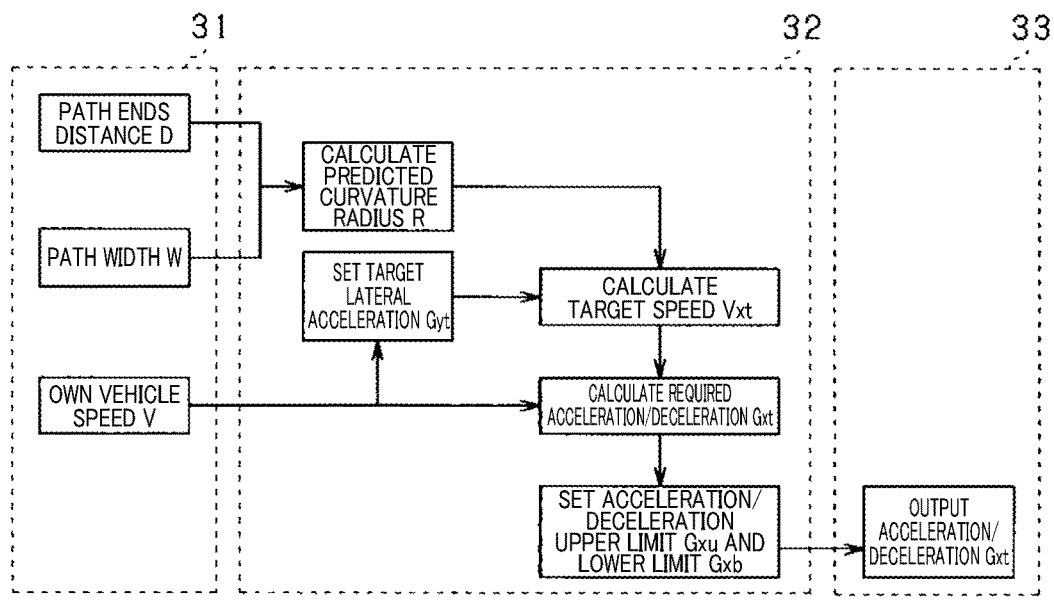
FIG. 2 is a functional block diagram of a vehicle control ECU.

As shown in FIG. 2, the vehicle control ECU 20 can acquire a path end (side, edge) distance (distance to an end (a side, an edge) of a path) D, a path width (width of a path) W, and an own vehicle velocity (velocity of the own vehicle) V as input data 31 to perform arithmetic processing 32 and output an acceleration/deceleration Gx of the own vehicle in the traveling direction. It is noted that regarding a velocity, an acceleration/deceleration, and the like, an index x indicates a traveling direction of the own vehicle, and an index y indicates a lateral direction perpendicular to the traveling direction of the own vehicle. In the following description, the index x or y may be used to distinguish between a traveling direction component and a lateral direction component to omit the terms "traveling direction" and "lateral direction".

The arithmetic processing 32 calculates an anticipated curvature radius (anticipated radius of curvature) R based on the path end distance D and the path width W. The arithmetic processing 32 calculates a target lateral acceleration/deceleration Gyt, which is a target value of a lateral acceleration/deceleration Gy of the own vehicle, based on the own vehicle velocity V. Then, the arithmetic processing 32 calculates a target velocity Vxt based on the anticipated curvature radius R and the target lateral acceleration/deceleration Gyt. The target velocity Vxt is a target velocity which the own vehicle has to reach before starting the turn. Furthermore, the arithmetic processing 32 calculates a target acceleration/deceleration Gxt of the own vehicle based on an own vehicle velocity Vx and the target velocity Vxt. The target acceleration/deceleration Gxt can be calculated by the following expression (1) based on the target velocity Vxt, the own vehicle velocity Vx, and dt. The time dt indicates a time period required for the own vehicle velocity Vx to reach the target velocity Vxt. Typically, dt may be a value between approximately 0.5 sec. and approximately one sec. when the own vehicle decelerates and may be a value between approximately 0.5 sec. and approximately two sec. when the own vehicle accelerates. The target acceleration/deceleration Gxt is an acceleration when Gxt>0, and is a deceleration when Gxt<0.

$$Gxt=(Vxt-Vx)/dt \quad (1)$$

The arithmetic processing 32 adjusts the calculated target acceleration/deceleration Gxt so as to fall within a predetermined range of acceleration/deceleration. That is, an upper limit Gxu and a lower limir Gxb of acceleration/deceleration of the own vehicle are set. When Gxt is within a range expressed by Gxb≤Gxt≤Gxu, the arithmetic processing 32 outputs the target acceleration/deceleration Gxt as the acceleration/deceleration Gx. When Gxt is Gxt≤Gxb, the arithmetic processing 32 outputs the lower limit Gxb as the acceleration/deceleration Gx. When Gxt>Gxu, the arithmetic processing 32 outputs the upper limit Gxu as the acceleration/deceleration Gx. The arithmetic processing 32 calculates the target acceleration/deceleration Gxt and outputs the target acceleration/deceleration Gxt of the own vehicle in the traveling direction within a range expressed by Gxb≤Gxt≤Gxu.

The vehicle control ECU 20 includes a distance acquisition section 21, a path width acquisition section 22, a velocity acquisition section 23, an anticipated curvature radius acquisition section 24, a target velocity setting section 25, a target acceleration/deceleration calculation section 26, and a vehicle control section 27. The sections 21 to 26 included in the vehicle control ECU 20 can performs the process in the arithmetic processing 32. The vehicle control ECU 20 functions as a vehicle control device including the above sections.

The distance acquisition section 21 acquires the path end distance D, which is a distance between the own vehicle and an end (a side, an edge) of a turn travel path in which the own vehicle travels with turning. The turn travel path is a path in which the own vehicle travels with turning by steering. Specifically, for example, the turn travel path may be due to the shape of a road such as a curbed road, a crossroads, a T-junction, or the like. For example, the turn travel path may avoid a parked or stopped vehicle, a static obstacle, or the like present in front of the own vehicle in the traveling direction.

To avoid a preceding vehicle, although a distance to a collision point is the path end distance D as in the case of a parked or stopped vehicle, it is necessary to consider that the preceding vehicle moves during a TTC (Time To Collision), which is a time period at the end of which the own vehicle collides with the preceding vehicle. Hence, the path end distance D to the preceding vehicle can be expressed by the product of an own vehicle velocity V and a TTC between the own vehicle and the preceding vehicle as expressed by the following expression (2). The TTC can be calculated by the following expression (3) from a relative distance Do between the own vehicle and the preceding vehicle and a relative velocity between the own vehicle and the preceding vehicle.

$$D = V * TTC \quad (2)$$

$$TTC = Do/(-Vr) \quad (3)$$

The end of the turn travel path provided due to the shape of the road can be recognized by, for example, detecting an object indicating an edge (a side) of the road such as a lane marking on the road or a road sign. The end of the turn travel path provided to avoid a parked or stopped vehicle or the like can be recognized by, for example, detecting an object to be avoided.

The path end distance D may be acquired based on the link data and the node data configuring the road map data output from the navigation system 19. The path end distance D may be estimated from information on a structure accompanying the road, such as a lane marking, a pole, a guardrail, a curb, a reflective board, and a delineator, output from the radar 17 or the image recognition processing unit 16.

The distance acquisition section 21 may set a plurality of ends of the turn travel path to acquire respective path end distances D for the plurality of ends. For example, respective path end distances D may be acquired for a plurality of objects of structures accompanying the road indicating an edge of the road, such as a lane marking, a pole, and a guardrail. By acquiring a plurality of path end distances D for a plurality of objects, when one of the objects cannot be recognized while an own vehicle 40 is traveling, the path end distance D for another of the objects can be used. When a plurality of path end distances D are acquired, one or some of them may be preferentially used and another of the path end distances D which is not used may be used as needed. Specifically, the path end distance D acquired based on recognizing a lane marking (white line) indicating an edge of the road may be preferentially used. When the lane marking becomes difficult to recognize, the path end distance D acquired based on recognizing a structure accompanying the road may be used. Alternatively, a representative value, an average value, or the like of some or all of the plurality of path end distances D may be calculated to statistically calculate the path end distance D. Statistical processing can reduce an error of the path end distance D.

The path width acquisition section 22 acquires a lateral width of the turn travel path as the path width W. In a case of the turn travel path provided due to the shape of the road, for example, a lane width may be detected as the path width W to be acquired. In a case of the turn travel path provided to avoid a parked or stopped vehicle or the like, for example, an object that is a target to be avoided may be detected to calculate the turn travel path for the avoidance as the path width W to be acquired.

The path width W may be acquired based on the link data and the node data configuring the road map data output from the navigation system 19. The path width W may be estimated from information on a structure accompanying the road, such as a lane marking, a pole, a guardrail, a curb, a reflective board, and a delineator, output from the radar 17 or the image recognition processing unit 16. When it is difficult to acquire a lane width, for example, when the travel starts or when there are no lanes, a typical lane width (e.g., approximately 3 to 4 m) may be used as the path width W.

The velocity acquisition section 23 acquires the own vehicle velocity V. The own vehicle velocity V can be calculated based on, for example, detection data from a peripheral monitoring device such as the CCD camera 15, the radar 17, or the like, or a vehicle sensor installed in the own vehicle.

The anticipated curvature radius acquisition section 24 acquires a curvature radius R of an anticipated turn travel path obtained by assuming that the own vehicle starts turning from a pre-turn position that is a position before a position at which the own vehicle starts. The anticipated curvature radius acquisition section 24 can acquire the anticipated curvature radius R of the anticipated turn travel path based on the path end distance D acquired by the distance acquisition section 21 at the pre-turn position and the path width W acquired by the path width acquisition section 22.

The anticipated curvature radius R of a curved road will be described with reference to FIGS. 3 and 4. In a typical road, easement curve sections are provided before and after a circular curve section in such a manner that straight line section→easement curve (clothoid, cubic parabola, or the like) section→circular curve section→easement curve section→straight line section. However, in the present embodiment, for simplicity, as shown in FIG. 4, the anticipated curvature radius R will be described by exemplifying a road 80 having a curve configured only by a circular curve section.

Figure 3:
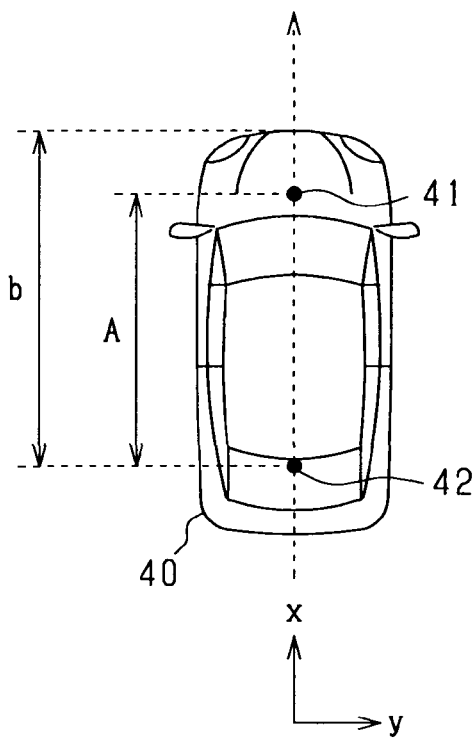
FIG. 3 illustrates a rear wheel axis and a front wheel axis of an own vehicle.

As shown in FIG. 3, the distance between a front wheel axis 41 and a rear wheel axis 42 of the own vehicle 40 is A. The distance between a front end (end portion on the front in the traveling direction) of the own vehicle 40 and the rear wheel axis 42 is b. The front wheel axis 41 and the rear wheel axis 42 are points on a central axis extending in the traveling direction at the center of the own vehicle 40 in the lateral direction.

Figure 4:
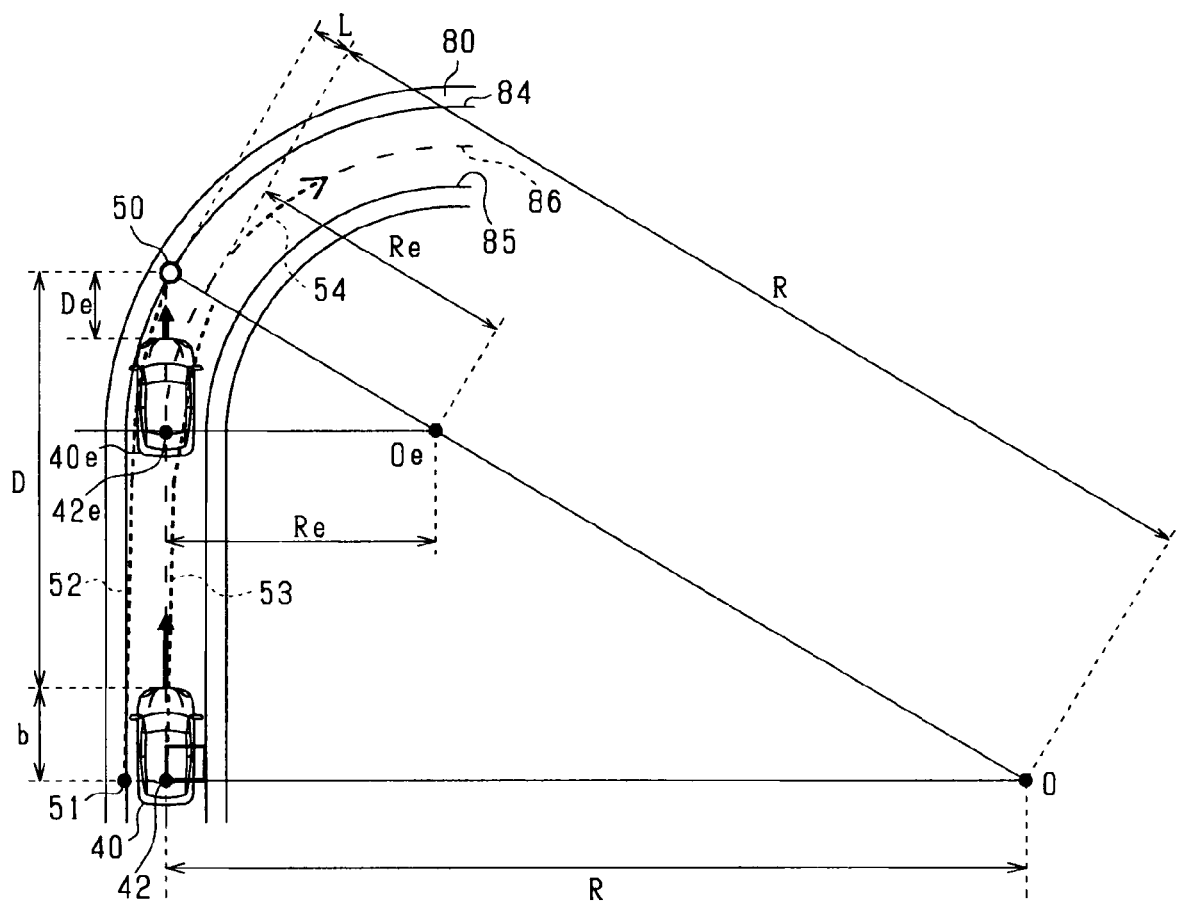
FIG. 4 illustrates a relationship between a radius of curvature of the own vehicle obtained when the own vehicle turns along a curved road and an anticipated radius of curvature.

In FIG. 4, the own vehicle 40 is at the pre-turn position, and an own vehicle 40e indicates a position of the own vehicle 40 at the time point when the own vehicle 40 starts turning. At the pre-turn position, the own vehicle 40 travels in the straight line section of the road 80 toward the curved section. The traveling direction of the own vehicle 40 is a direction in which the own vehicle 40 travels in a straight line along the straight line section of the road 80. A left lane marking 84 is a left side (edge) of a lane on the road 80. A right lane marking 85 is a right side (edge) of the lane on the road 80. A road end 50 indicates an edge (a side) of the road 80 and is a point located on an extended line of the central axis of the own vehicle 40. For example, in a right-hand curved road such as the road 80, the road end 50 may be an intersection between the extended line of the central axis of the own vehicle 40 and the left lane marking 84 indicating an edge (a side) of the road 80.

The end of the turn travel path is not limited to be located, as in the road end 50, at an intersection between the left lane marking 84 indicating an edge of the road 80 on which the own vehicle 40 plans to travel and an extended line of the central axis of the own vehicle 40. The end of the turn travel path may be located on the left lane marking, whose distance to the own vehicle 40 is the shortest in a belt-like area that has a predetermined size in the lateral direction of the own vehicle 40 and extends along the traveling direction of the own vehicle 40.

The anticipated curvature radius R is obtained by assuming that the own vehicle 40 at the pre-turn position starts to turn around the center O and corresponds to a distance between the center O and the rear wheel axis 42. A road end 51 is located on the left lane marking 84 leftward from the rear wheel axis 42 of the own vehicle 40. The distance between the rear wheel axis 42 and the road end 51 is L. The distance L corresponds to ½ of the path width W corresponding to a lane width of the road 80 (L=W/2). The path width W corresponds to a distance between the left lane marking 84 and the right lane marking 85, that is, a lane width. The distance L corresponds to a distance from a center position 86 indicating the center of the road 80 to the left lane marking 84 or the right lane marking 85. A track 53 is a track of the rear wheel axis 42 obtained when the own vehicle 40 starts turning from the pre-turn position. A track 52 is a track distanced from the track 53 leftward by the distance L. The path end distance D is a distance from the front end of the own vehicle 40 to the road end 50.

Since the rear wheel axis 42, the road end 50, and the center O are located at the apexes of a rectangular triangle, the following expression (4) is established based on the Pythagorean theorem. Hence, the anticipated curvature radius R can be calculated by the following expression (5) obtained by modifying the following expression (4).

$$(D+b)\wedge 2+R\wedge 2=(R+L)\wedge 2 \quad (4)$$

$$R=\{(D+b)\wedge 2-L\wedge 2\}/2*L \quad (5)$$

The own vehicle 40e indicates a position of the own vehicle at which the own vehicle starts turning (turn start position). The index e indicates a turn start position. A rear wheel axis 42e is a position of the rear wheel axis of the own vehicle 40e. A path end distance De is a distance from the front end of the own vehicle 40e to the road end 50. A curvature radius Re is a radius of curvature obtained when the own vehicle 40e turns around the center Oe. The own vehicle 40e indicates a position at which the own vehicle actually starts to turn, in other words, a position at which the own vehicle 40 actually starts steering. Hence, the curvature radius Re is a radius of curvature obtained when the own vehicle 40 actually steers.

Since the rear wheel axis 42e, the road end 50e, and the center Oe are located at the apexes of a rectangular triangle, this case also meets the Pythagorean theorem. In the following expressions (4) and (5), D is interchanged with De, and R is interchanged with Re to calculate the curvature radius Re. As the own vehicle 40 travels toward the position of the own vehicle 40e, R approaches Re, and D approaches De. As the own vehicle 40 travels toward the position of the own vehicle 40e, the curvature radius R approaches the curvature radius Re obtained when the own vehicle 40 actually starts steering.

Figure 5:
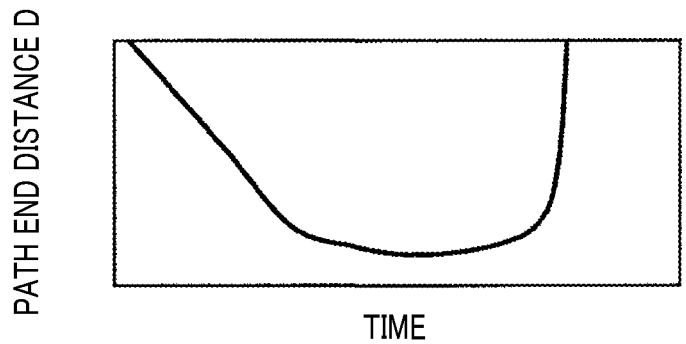
FIG. 5 illustrates a change with time of a path end distance during the turning of the own vehicle along the curved road and before and after the turning.
Figure 6:
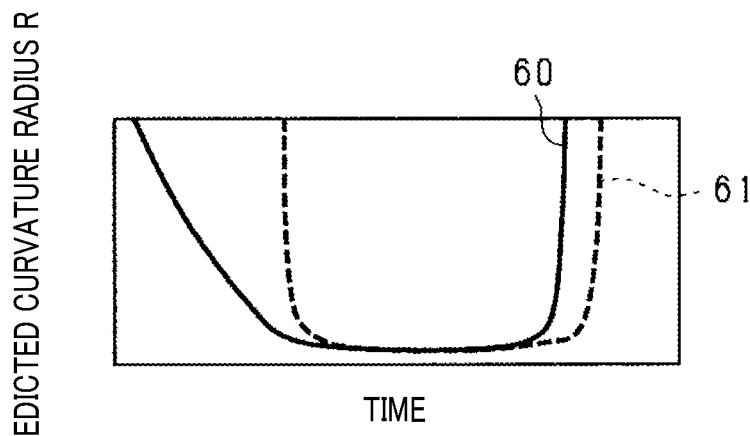
FIG. 6 illustrates a change with time of an anticipated radius of curvature during the turning of the own vehicle along the curved road and before and after the turning.
Figure 7:
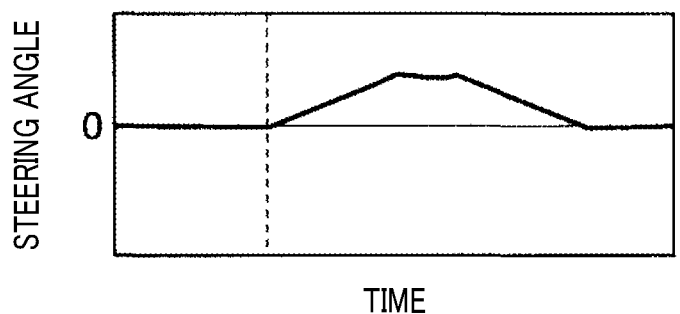
FIG. 7 illustrates a change with time of a steering angle of the own vehicle during the turning of the own vehicle along the curved road and before and after the turning.

FIGS. 5 to 7 illustrate the path end distance D, the anticipated curvature radius R (shown by a broken line 60), and a change with time of a steering angle of the own vehicle on the same time axis. In FIG. 7, the time is shown by a broken line is the time at which the own vehicle 40 has reached the position of the own vehicle 40e (turn start position) from which steering of the own vehicle 40 starts. As shown in FIGS. 5 to 7, as the own vehicle 40 travels toward the position of the own vehicle 40e, the path end distance D approaches the path end distance De, and the curvature radius R approaches the curvature radius Re obtained when the own vehicle 40 actually starts steering.

FIG. 6 also illustrates, for comparison, the curvature radius of the own vehicle 40 for which acquisition is started from the turn start position by a broken line 61. As shown in FIG. 6, it can be understood that vehicle control ECU 20 can acquire the anticipated curvature radius R at a stage sufficiently earlier than the turn start position.

The target velocity setting section 25 sets a target velocity Vx at which the own vehicle 40 travels on the turn travel path, based on the anticipated curvature radius. For example, when the own vehicle 40 travels on the turn travel path, the target velocity setting section 25 can set the target velocity Vx based on the following expression (6) from the target lateral acceleration/deceleration Gyt, which is a lateral direction component of a target acceleration/deceleration of the own vehicle 40 described later, and the anticipated curvature radius R. The vehicle control ECU 20 stores information on a relationship between the own vehicle velocity Vx, a side skid friction coefficient μ, and the target lateral acceleration/deceleration Gyt as a map or an expression. The target velocity setting section 25 can read the stored map or the like to set the target lateral acceleration/deceleration Gyt based on the acquired own vehicle velocity V.

$$Vxt=(|R*Gyt|)\wedge \tfrac{1}{2} \quad (6)$$

The target acceleration/deceleration calculation section 26 calculates the target acceleration/deceleration Gxt for decelerating the own vehicle 40 to the target velocity Vxt, based on the own vehicle velocity Vx and the target velocity Vxt. For example, the target acceleration/deceleration calculation section 26 calculates the target acceleration/deceleration Gxt, which is a traveling direction component of the target acceleration/deceleration of the own vehicle 40. The target acceleration/deceleration calculation section 26 may calculate the target acceleration/deceleration Gxt on condition that the difference between the own vehicle velocity Vx and the target velocity Vxt is a predetermined value dV or more.

The target acceleration/deceleration calculation section 26 may set the target lateral acceleration/deceleration Gyt based on the own vehicle velocity Vx acquired by the velocity acquisition section 23 and the side skid friction coefficient μ of a road surface on which the own vehicle travels. The side skid friction coefficient μ may be acquired as part of road information from the navigation system 19 or stored in the vehicle control ECU 20 in association with the road information.

When the own vehicle starts turning, if the own vehicle velocity V has not been sufficiently decreased to approximately the target velocity Vxt, an actual lateral acceleration/deceleration Gy becomes high while the own vehicle is turning. If the lateral acceleration/deceleration Gy is too high, a concern arises that a side skid may be caused while the own vehicle is turning. Alternatively, if the lateral acceleration/deceleration Gy is not too high while the own vehicle is turning, even if the own vehicle 40 has not been sufficiently decelerated to approximately the target velocity Vxt, it is unlikely to cause a side skid. In this case, the turning is likely to be completed safely though the own vehicle velocity V has not been decreased to approximately the target velocity Vxt.

Hence, setting the predetermined value dV based on the lateral acceleration/deceleration Gy and calculating the target acceleration/deceleration Gxt on condition that the difference between the own vehicle velocity Vx and the target velocity Vxt is a predetermined value dV or more can achieve turning with suppression of a side skid while preventing unnecessary acceleration and deceleration.

The target lateral acceleration/deceleration Gyt may be changed depending on the contents of driving assistance for the own vehicle 40 performed by the vehicle control ECU 20. For example, when typical driving assistance such as assistance for operation by a driver is performed, the absolute value of the target lateral acceleration/deceleration Gyt may be set to be small. When PCS (Pre-Crash Safety, registered trademark) control is performed, the absolute value of the target lateral acceleration/deceleration Gyt may be set to be large.

The vehicle control section 27 performs acceleration/deceleration control based on the target acceleration/deceleration Gxt so that the own vehicle 40 reaches the target velocity Vxt at the time point when the own vehicle 40 arrives at the turn start position of the own vehicle 40e. The vehicle control section 27 may perform acceleration/deceleration control of the own vehicle 40 if the target lateral acceleration/deceleration Gyt is more than a predetermined threshold value.

The vehicle control section 27 may perform acceleration/deceleration control of the own vehicle 40 if the target lateral acceleration/deceleration Gyt is more than a predetermined threshold value Gyu (Gyt>Gyu). The threshold value Gyu is preferably set to a value by which a side skid of the own vehicle is suppressed. Thereby, turning while suppressing a side skid can be achieved while the own vehicle velocity V is kept a relative high velocity. Furthermore, if the target lateral acceleration/deceleration Gyt has become the predetermined threshold value Gyu or less while the acceleration/deceleration control is being performed, the vehicle control section 27 may stop the acceleration/deceleration control for the own vehicle 40.

Next, a vehicle control process performed by the vehicle control ECU 20 will be described with reference to the flowchart shown in FIG. 8. The vehicle control process illustrated in FIG. 8 is repeatedly performed at predetermined intervals.

Figure 8:
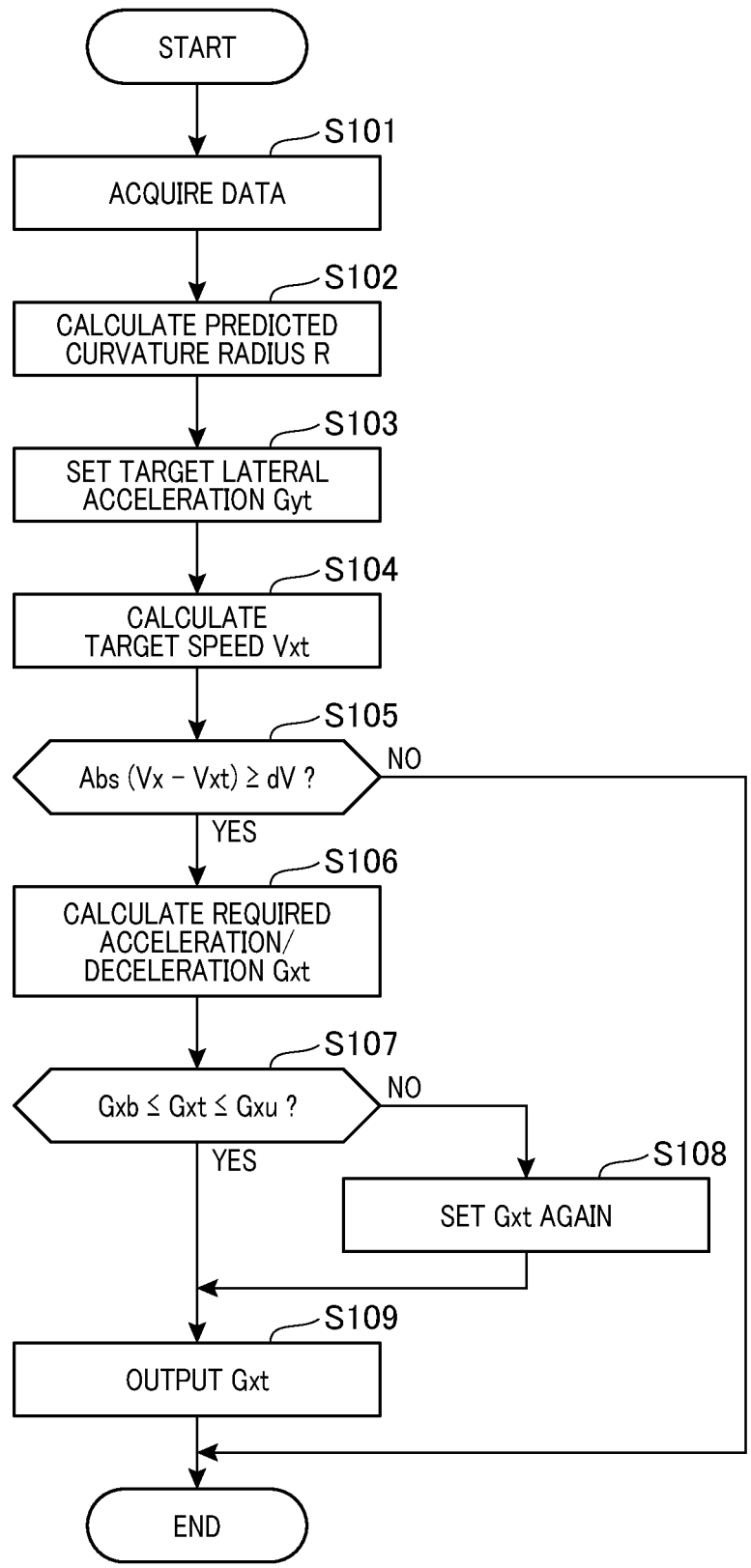
FIG. 8 is a flowchart of a driving assistance process performed by the vehicle control ECU.

First, in step S101 shown in FIG. 8, the vehicle control ECU 20 acquires data regarding information on the periphery of the own vehicle 40 such as the path end distance D and the path width W, data regarding a state quantity of the vehicle such as the own vehicle velocity V, and the like. Then, the process proceeds to step S102.

In step S102, the vehicle control ECU 20 calculates the anticipated curvature radius R based on the above expression (5) by using the data such as the path end distance D and the path width W acquired in step S101. Then, the process proceeds to step S103.

In step S103, the vehicle control ECU 20 sets the target lateral acceleration/deceleration Gyt based on the map or the like stored therein by using the own vehicle velocity V acquired in step S101. Then, the process proceeds to step S104.

In step S104, the vehicle control ECU 20 calculates a target velocity Vt based on the above expression (6) by using the anticipated curvature radius R calculated in step S102 and the target lateral acceleration/deceleration Gyt set in step S103. Then, the process proceeds to step S105.

In step S105, the vehicle control ECU 20 compares Vx, which is a traveling velocity component of the own vehicle velocity V acquired in step S101, with the target velocity Vxt set in step S105 to determine whether the difference between the own vehicle velocity Vx and the target velocity Vxt is the predetermined value dV or more. If Abs (Vx−Vxt), which is the absolute value of Vx−Vxt meets Abs (Vx−Vxt)≥dV, the process proceeds to step S106. If Abs (Vx−Vxt)<dV, the process ends.

In step S106, the vehicle control ECU 20 calculates the target acceleration/deceleration Gx based on the above expression (1) by using the own vehicle velocity Vx and the target velocity Vxt. If the own vehicle velocity Vx is more than the target velocity Vxt, the vehicle control ECU 20 calculates the target acceleration/deceleration Gxt for decelerating the own vehicle 40 to the target velocity Vxt. If the own vehicle velocity Vx is less than the target velocity Vxt, the vehicle control ECU 20 calculates the target acceleration/deceleration Gxt for accelerating the own vehicle 40 to the target velocity Vxt.

In step S107, the vehicle control ECU 20 determines whether Gxt is within a range of Gxb≤Gxt≤Gxu. If Gxb≤Gxt≤Gxu is met, the process proceeds to step S109 in which the vehicle control ECU 20 the vehicle control ECU 20 outputs the target acceleration/deceleration Gxt calculated in step S106 as the acceleration/deceleration Gx. If Gxb Gxt Gxu is not met, the process proceeds to step S108 in which the vehicle control ECU 20 sets Gxt again. If Gxt Gxb, the vehicle control ECU 20 sets the lower limit Gxb as the target acceleration/deceleration Gxt again. If Gxt>Gxu, the vehicle control ECU 20 outputs the upper limit Gxu as the target acceleration/deceleration Gxt. Thereafter, the process proceeds to step S109 in which the vehicle control ECU 20 outputs Gxt that has been set again, as the acceleration/deceleration Gx.

After step S109, the process proceeds to step S110. In step S110, the vehicle control ECU 20 performs vehicle control based on the calculated acceleration/deceleration Gx. Thereafter, the process ends.

As described above, the vehicle control ECU 20 acquires the anticipated curvature radius R, which is a radius of curvature of an anticipated turn travel path obtained by assuming that a turn travel path starts from a pre-turn position, based on the path width W and the path end distance D obtained at the pre-turn position before the position at which the own vehicle 40 starts turning. Then, the vehicle control ECU 20 sets the target velocity Vt at which the own vehicle 40 travels on the turn travel path based on the anticipated curvature radius R, and calculates the target acceleration/deceleration Gxt of the own vehicle 40 based on the target velocity Vt and the like. Hence, the vehicle control ECU 20 can acquire the target acceleration/deceleration Gxt at a stage at which the own vehicle 40 is at the pre-turn position and can control the velocity of the own vehicle 40 at an early stage based on target acceleration/deceleration Gxt. Since the own vehicle 40 can perform the velocity control at an early stage at which the own vehicle 40 is at the pre-turn position, the own vehicle 40 can accelerate or decelerate more appropriately before the own vehicle 40 travels on the turn travel path such as a curved road.

Second Embodiment

In also a case where a turn travel path is provided for avoiding a parked or stopped vehicle, a static obstacle, or the like present in front of the own vehicle in the traveling direction, the vehicle control ECU 20 can similarly calculate the anticipated curvature radius R based on data on the path end distance D, the path width W, and the like and calculate the acceleration/deceleration Gx and the like to control the own vehicle 40.

Figure 9:
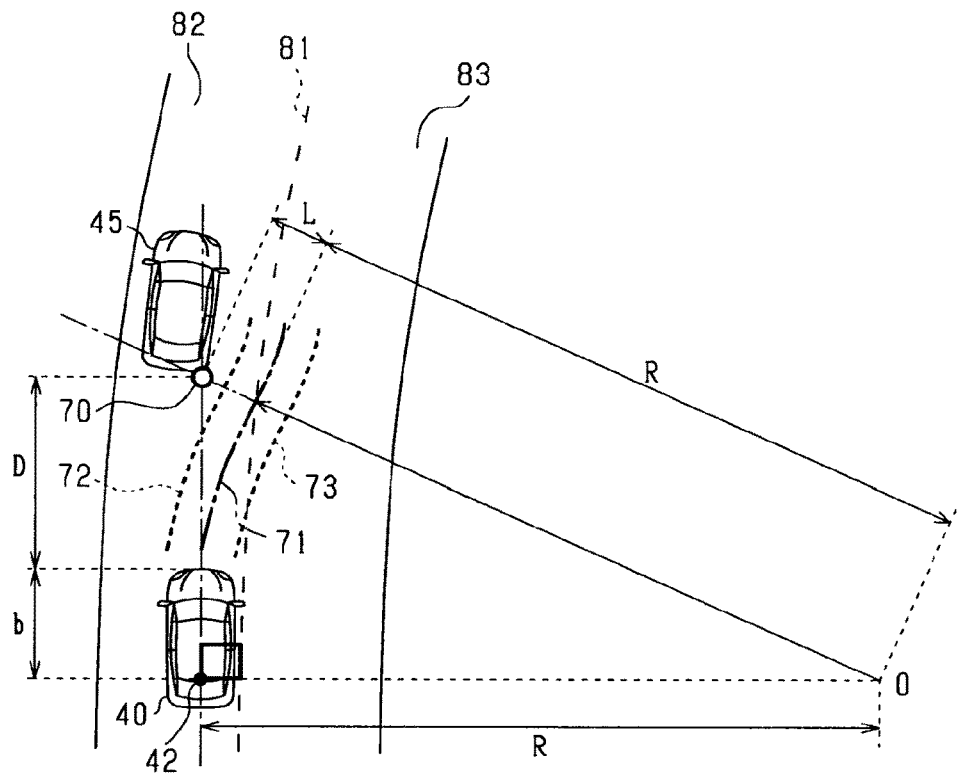
FIG. 9 illustrates an anticipated radius of curvature of an alternative path for the own vehicle to avoid a parked vehicle.

With reference to FIG. 9 showing the own vehicle 40 that travels on a road including a left lane 82 and a right lane 83, which are defined by a lane marking 81, and a parked or stopped vehicle 45, a case where the own vehicle 40 passes the parked or stopped vehicle 45 will be exemplified.

On the turn travel path for avoiding the parked or stopped vehicle 45, the distance acquisition section 21 specifies, as a path end 70, a position, at which the distance between the own vehicle 40 and the parked or stopped vehicle 45 is the shortest, in a belt-like area that has a predetermined size in the lateral direction of the own vehicle 40 and extends along the traveling direction of the own vehicle 40. Then, the distance acquisition section 21 acquires, as the path end distance D, a distance between the path end 70 set to the parked or stopped vehicle 45 and the own vehicle 40. Setting the path end 70 in this manner makes the path end distance D the shortest distance between the parked or stopped vehicle 45 and the own vehicle 40. The path end distance D indicates a distance to a collision point between the own vehicle 40 and the parked or stopped vehicle 45.

The path width acquisition section 22 acquires a lane width of the left lane 82 or the right lane 83 as the path width W. The path width acquisition section 22 may use a typical lane width (e.g., approximately 3 to 4 m) as the path width W.

As the path width W, the width of a predicted turn travel path may be acquired. For example, a track of the own vehicle 40 for avoiding the parked or stopped vehicle 45 may be predicted to set a turn travel path based on the prospective track. FIG. 9 shows tracks 71 to 73 as examples of the predicted tracks. The track 71 is a track of the central axis of the own vehicle 40. The track 72 is a track of a left end of the own vehicle 40. The track 73 is a track of a right end of the own vehicle 40. The path width acquisition section 22 may predict, as a turn travel path, a path extending in the lateral direction so as to be longer than the distance between the track 72 and the track 73, which is the width of the own vehicle 40, to acquire the width of the turn travel path in the lateral direction as the path width W.

As in the case of FIG. 4, the rear wheel axis 42, the center O, and the path end 70 shown in FIG. 9 are located at the apexes of a rectangular triangle. Hence, the anticipated curvature radius R can be calculated based on the above expressions (4) and (5). The distance L is ½ of the acquired path width W. As the own vehicle 40 approaches the parked or stopped vehicle 45, the curvature radius R approaches a curvature radius obtained when the own vehicle 40 actually starts steering.

As described above, when the own vehicle 40 avoids a collision with the parked or stopped vehicle 45 or the like, which is a target to be avoided, or when the own vehicle 40 passes the parked or stopped vehicle 45 or the like, the vehicle control ECU 20 acquires the path end distance D and the path width W regarding the turn travel path on which the own vehicle 40 performs turning. The path end distance D is set as a distance to a point of a collision with the parked or stopped vehicle 45. Then, the vehicle control ECU 20 calculates the anticipated curvature radius R based on the path end distance D and the path width W acquired at a pre-turn position that is a position before a position at which the own vehicle performs steering for avoiding a target to be avoided to start turning. As a result, as in the case of turning on a curved road or the like, acceleration and deceleration can be performed more appropriately before the own vehicle 40 starts steering for avoiding the parked or stopped vehicle 45 or the like to start travel on the turn travel path.

Third Embodiment

Even in a case where the turn travel path is provided for avoiding a preceding vehicle traveling in front of the own vehicle 40 in the traveling direction, the vehicle control ECU 20 can calculate the anticipated curvature radius R based on the data on the path width W, the path end distance D set as a distance to a collision point between the own vehicle 40 and a preceding vehicle 46, and the like and calculate the acceleration/deceleration Gx and the like to control the own vehicle 40.

Figure 10:
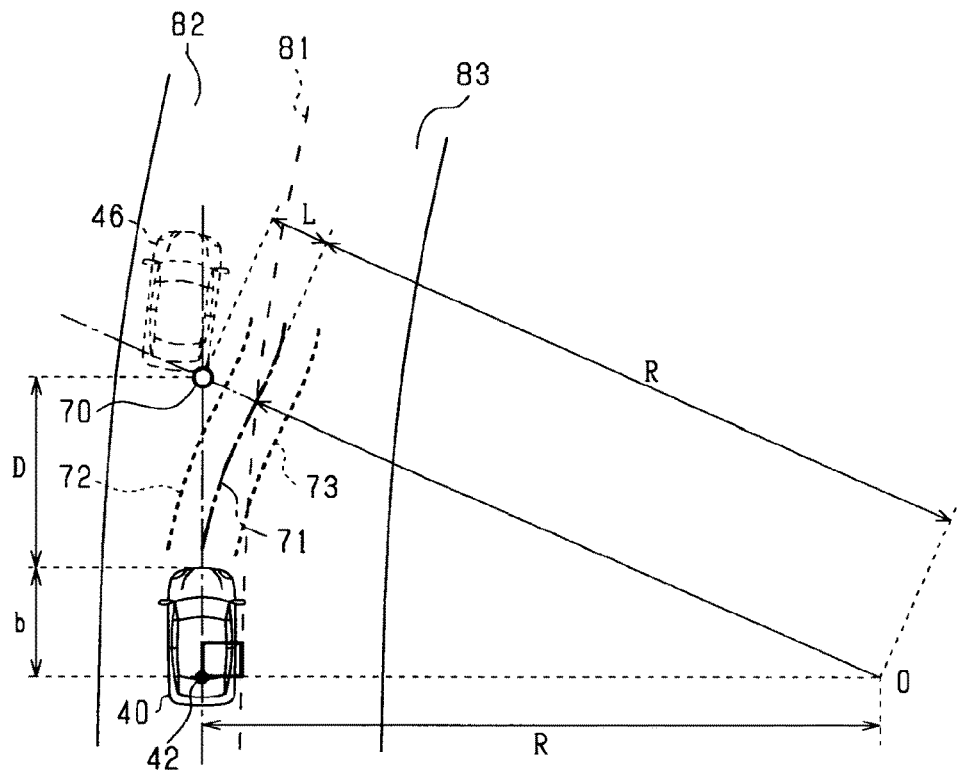
FIG. 10 illustrates an anticipated radius of curvature of an alternative path for the own vehicle to avoid a preceding vehicle.

With reference to FIG. 10, a case where the own vehicle 40 passes the preceding vehicle 46 will be exemplified. A relative distance between the own vehicle 40 and the preceding vehicle 46 is Do. A velocity of the preceding vehicle 46 is Vp. Since other matters are similar to those in FIG. 9, the descriptions thereof are omitted.

Considering that the preceding vehicle 46 moves during TTC, which is a time period at the end of which the own vehicle 40 collides with the preceding vehicle 46, the path end distance D to the collision point can be expressed by the following expression (7) by using a relative distance Do between the own vehicle and the preceding vehicle, an own vehicle velocity V, a velocity Vp of the preceding vehicle, a relative velocity Vr between the own vehicle and the preceding vehicle, and a TTC.

$$D = Do + Vp*TTC \quad (7)$$

According to the above expression (3), the relative distance Do can be expressed by $D=(-Vr)*TTC$ from TTC and the relative velocity Vr. Using this in the expression (7), the following expression (8) can be obtained.

$$D = (-Vr)*TTC + Vp*TTC = (Vp-Vr)*TTC = V*TTC \quad (8)$$

The anticipated curvature radius R can be calculated based on the expressions (4) and (5) by using the path end distance D calculated by the expression (8). The distance L is ½ of the acquired path width W as in the second embodiment. As the own vehicle 40 approaches the preceding vehicle 46, the curvature radius R approaches a curvature radius obtained when the own vehicle 40 actually starts steering.

As described above, when the own vehicle 40 avoids a collision with the preceding vehicle 46 or the like, which is a target to be avoided, or when the own vehicle 40 passes the preceding vehicle 46 or the like, the vehicle control ECU 20 acquires the path end distance D and the path width W regarding the turn travel path on which the own vehicle 40 performs turning. The path end distance D is set as a distance to a point of a collision calculated considering that the preceding vehicle 46 moves during a TTC, which is a time period at the end of which the own vehicle 40 collides with the preceding vehicle 46. Then, the vehicle control ECU 20 calculates the anticipated curvature radius R based on the path end distance D and the path width W acquired at a pre-turn position that is a position before a position at which the own vehicle performs steering for avoiding a target to be avoided to start turning. As a result, as in the case of turning on a curved road or the like, acceleration and deceleration can be performed more appropriately before the own vehicle 40 starts steering for avoiding the preceding vehicle 46 to start travel on the turn travel path.

According to the above embodiment, the following effects can be obtained.

The vehicle control ECU 20 includes the distance acquisition section 21, the path width acquisition section 22, the velocity acquisition section 23, the anticipated curvature radius acquisition section 24, the target velocity setting section 25, the target acceleration/deceleration calculation section 26, and the vehicle control section 27. The distance acquisition section 21 acquires the path end distance D, which is a distance between the own vehicle 40 and the road end 50 or the path end 70, which is located in the traveling direction of the own vehicle 40 and is an end of the turn travel path on which the own vehicle travels with turning. The path width acquisition section 22 acquires the path width W of the turn travel path. The velocity acquisition section 23 acquires the own vehicle velocity V. The anticipated curvature radius acquisition section 24 acquires the curvature radius R of the anticipated turn travel path obtained by assuming that the turn travel path starts from a pre-turn position, based on the path width W and the path end distance D obtained at the pre-turn position before the position at which the own vehicle 40 starts turning. The target velocity setting section 25 sets a target velocity Vx at which the own vehicle 40 travels on the turn travel path, based on the anticipated curvature radius R. The target acceleration/deceleration calculation section 26 calculates the target acceleration/deceleration Gxt for accelerating or decelerating the own vehicle 40 to the target velocity Vxt, based on the own vehicle velocity Vx and the target velocity Vxt. As described above, the target velocity Vx and the target acceleration/deceleration Gxt can be calculated based on the anticipated curvature radius R acquired at a stage at which the own vehicle 40 is present at the pre-turn position. Hence, the vehicle control section 27 can perform acceleration/deceleration control of the own vehicle 40 from a stage at which the own vehicle 40 is at the pre-turn position so that the own vehicle 40 reaches the target velocity Vxt when the own vehicle 40 starts turning. As a result, acceleration and deceleration can be performed more appropriately before the own vehicle 40 starts travel on a curved road or the like or turning for avoiding the parked or stopped vehicle 45 or the preceding vehicle 46 to start travel on the turn travel path.

The end of the turn travel path may be the road end 50 of the road 8 on which the own vehicle 40 plans to travel or the path end 70, which is an end of an object such as the parked or stopped vehicle 45 or the preceding vehicle 46 to be avoided by the own vehicle 40. The end of the turn travel path may be, as in the road end 50, located along the traveling direction of the own vehicle 40 and on the extended line of the central axis of the own vehicle 40 in the lateral width direction (y direction shown in FIG. 3). If a peripheral monitoring device such as the radar 17 or the CCD camera 15 is placed in the vicinity of the central axis, and the path end distance D is acquired based on detection data from the peripheral monitoring device, a point on the extended line of the central axis is recognized as a path end, whereby the path end distance D can be acquired with high accuracy. The end of the turn travel path may be, as in the path end 70, at a position at which the distance to the own vehicle 40 is the shortest in a belt-like area that has a predetermined size in the lateral direction of the own vehicle 40 and extends along the traveling direction of the own vehicle 40.

The distance acquisition section 21 may set a plurality of ends of the turn travel path to acquire the respective path end distances D for the plurality of ends. When the plurality of path end distances D are acquired, the anticipated curvature radius acquisition section 24 may calculate respective anticipated curvature radii R based on the path end distances D for the plurality of ends, or the target velocity setting section 25 may set the target velocity Vxt based on the plurality of anticipated curvature radii R. Hence, redundancy in the control for the own vehicle 40 performed by the vehicle control ECU 20 is improved, and errors of the path end distance D, the anticipated curvature radius R, and the target velocity Vxt can be reduced.

The target acceleration/deceleration calculation section 26 may set the lateral direction component Gyt of the target acceleration/deceleration orthogonal to the traveling direction of the own vehicle 40, based on the own vehicle velocity Vx. If the lateral direction component Gyt of the target acceleration/deceleration is more than the predetermined threshold value Gyu, the vehicle control section 27 may perform acceleration/deceleration control of the own vehicle 40. Hence, turning with suppression of a side skid can be achieved while unnecessary acceleration and deceleration are prevented.

The present disclosure has been described according to the embodiments. However, the present disclosure should not be construed as being limited to the embodiments or the configurations. The present disclosure encompasses various modifications, or modifications within the range of equivalence. In addition, various combinations and modes, as well as other combinations and modes, including those which include one or more additional elements, or those which include fewer elements should be construed as being within the scope and spirit of the present disclosure.

The present disclosure provides a vehicle control device (20) that includes: a distance acquisition section (21) that acquires a path end distance, which is a distance between an own vehicle (40) and an end of a turn travel path, which is located in a traveling direction of the own vehicle and on which the own vehicle travels with turning; a path width acquisition section (22) that acquires a path width of the turn travel path; a velocity acquisition section (23) that acquires a velocity of the own vehicle; an anticipated curvature radius acquisition section (24) that acquires a curvature radius of an anticipated turn travel path obtained by assuming that the turn travel path starts from a pre-turn position before a position at which the own vehicle starts turning, based on the path width and the path end distance obtained at the pre-turn position; a target velocity setting section (25) that sets a target velocity at which the own vehicle should travel on the turn travel path, based on the anticipated curvature radius; a target acceleration/deceleration calculation section (26) that calculates a target acceleration/deceleration for accelerating or decelerating the own vehicle to the target velocity, based on the velocity of the own vehicle and the target velocity; and a vehicle control section (27) that performs acceleration/deceleration control of the own vehicle based on the target acceleration/deceleration.

According to the present disclosure, the anticipated curvature radius acquisition section acquires a curvature radius of an anticipated turn travel path obtained by assuming that the turn travel path starts from a pre-turn position before a position at which the own vehicle starts turning, based on the path width and the path end distance obtained at the pre-turn position. Then, the target velocity setting section sets a target velocity at which the own vehicle should travel on the turn travel path, based on the anticipated curvature radius. The target acceleration/deceleration calculation section calculates a target acceleration/deceleration of the own vehicle based on the target velocity and the like. Hence, the vehicle control section can acquire the target acceleration/deceleration at a stage at which the own vehicle is at the pre-turn position and can control the velocity of the own vehicle at an early stage based on the target acceleration/deceleration. According to the vehicle control device of the present disclosure, since the own vehicle can perform the velocity control at an early stage at which the own vehicle is at the pre-turn position, the own vehicle can accelerate or decelerate more appropriately before the own vehicle travels on the turn travel path such as a curved road.

What is claimed is:

1. A vehicle control device, comprising:
    a distance acquisition section that acquires a path end distance, which is a distance between an own vehicle and an end of a turn travel path, which is located in a traveling direction of the own vehicle and on which the own vehicle travels with turning;
    a path width acquisition section that acquires a path width of the turn travel path;
    a velocity acquisition section that acquires a velocity of the own vehicle;
    an anticipated curvature radius acquisition section that acquires, as an anticipated curvature radius, a curvature radius of an anticipated turn travel path based on the path width and the path end distance of a pre-turn position, the pre-turn position comprising a position of the own vehicle prior to a position at which the own vehicle starts to turn for the anticipated turn travel path;
    a target velocity setting section that sets a target velocity at which the own vehicle should travel on the turn travel path, based on the anticipated curvature radius;
    a target acceleration/deceleration calculation section that calculates a target acceleration/deceleration for accelerating or decelerating the own vehicle to the target velocity, based on the velocity of the own vehicle and the target velocity; and
    a vehicle control section that performs acceleration/deceleration control of the own vehicle based on the target acceleration/deceleration.

2. The vehicle control device according to claim 1, wherein
    the end of the turn travel path is an edge of a road on which the own vehicle plans to travel or an end of an object which the own vehicle plans to avoid.

3. The vehicle control device according to claim 1, wherein
    the end of the turn travel path is located along the traveling direction of the own vehicle and on an extended line of a central axis of the own vehicle in a lateral width direction.

4. The vehicle control device according to claim 1, wherein
    the end of the turn travel path is located at a position whose distance to the own vehicle is the shortest in a belt-shaped area that has a predetermined size in a lateral direction of the own vehicle and extends along the traveling direction of the own vehicle.

5. The vehicle control device according to claim 1, wherein
    the distance acquisition section sets a plurality of ends of the turn travel path to acquire respective path end distances for the plurality of ends.

6. The vehicle control device according to claim 1, wherein
    the target acceleration/deceleration calculation section sets a lateral direction component of the target acceleration/deceleration orthogonal to the traveling direction of the own vehicle, based on the velocity of the own vehicle velocity.

7. The vehicle control device according to claim 1, wherein
    the vehicle control section performs the acceleration/deceleration control of the own vehicle if a lateral direction component of the target acceleration/deceleration is more than a predetermined threshold value.

* * * * *